US008573610B1

(12) United States Patent
Meyers et al.

(10) Patent No.: US 8,573,610 B1
(45) Date of Patent: Nov. 5, 2013

(54) FOOTREST APPARATUS

(75) Inventors: Daniel Seth Meyers, Roxboro (CA); Ming Xu, Saint-Laurent (CA); Cristian Boar, Montreal (CA); Michael Izzo, Laval (CA)

(73) Assignee: AMG Medical Inc., Montreal, Quebec (CA)

(*) Notice: Subject to any disclaimer, the term of this patent is extended or adjusted under 35 U.S.C. 154(b) by 0 days.

(21) Appl. No.: 13/603,883

(22) Filed: Sep. 5, 2012

(51) Int. Cl.
*B62B 3/02* (2006.01)

(52) U.S. Cl.
USPC ..................... 280/47.4; 280/650; 297/423.25; 297/423.37

(58) Field of Classification Search
USPC ........................ 280/642, 647, 650, 657, 47.4; 297/423.1, 423.19, 423.25, 423.26, 297/423.28, 423.3, 423.31, 423.32, 423.33, 297/423.34, 423.35, 423.37; 403/376, 377, 403/378, 379.1, 322.2, 292
See application file for complete search history.

(56) References Cited

U.S. PATENT DOCUMENTS 3,758,150 A 9/1973 Williams
4,273,350 A 6/1981 Williams
4,770,467 A * 9/1988 Zinn ........................ 297/423.37
5,141,250 A * 8/1992 Morgan et al. ............. 280/250.1
5,522,644 A * 6/1996 Peek ........................ 297/423.26
6,196,565 B1 3/2001 Chubbuck
6,217,050 B1 4/2001 Dickie et al.
6,464,243 B2 10/2002 Roche
6,543,854 B1 4/2003 Finch
6,769,705 B1 8/2004 Schlangen
7,331,632 B2 2/2008 Wendt
7,523,950 B2 4/2009 Meyers et al.
7,628,411 B2 12/2009 Meyers et al.
7,635,142 B2 12/2009 Slagerman
7,823,230 B2 11/2010 Meyers et al.
8,191,913 B1 6/2012 Jessome
2007/0057561 A1 * 3/2007 Liao ........................ 297/423.19
2008/0093816 A1 4/2008 Meyers et al.

* cited by examiner

*Primary Examiner* — John Walters
(74) *Attorney, Agent, or Firm* — Norton Rose Fulbright Canada LLP

(57) ABSTRACT

A footrest apparatus for a wheelchair and the like has a pair of supporting frame configurations supporting a pair of foot plates to be position in a first position for use and a second position for transportation and/or storage. Each of the supporting frame configurations has a connecting shaft rotatably received in a vertical tube of a front wheel assembly. The vertical tube is affixed to a frame structure of the wheelchair and the like. The connecting shaft and the vertical tube in combination bear and transfer a foot load of the user and therefore a locking device provided between the connecting shaft and the vertical tube for locking the connecting frame configuration in a selected one of the first and second positions, will not bear the foot load, resulting a configuration convenience for conducting an unlock action.

7 Claims, 3 Drawing Sheets

FOOTREST APPARATUS

TECHNICAL FIELD

The described subject matter generally relates to a device for assisting a user with mobility, such as a wheelchair or a rolling walker having a seat and being convertible to a temporary transportation tool, and more particularly to a footrest apparatus of a wheelchair and the like.

BACKGROUND OF THE ART

A wheelchair or a rolling walker convertible to a temporary transportation tool, is commonly used as a device for assisting elderly, handicapped people or patients, with mobility. Such a wheelchair or the like, conventionally has a frame structure in either a fixed or collapsible configuration, supported on a plurality of wheels rotatably attached to the frame structure. A seat member and a footrest apparatus are typically provided to support a user sitting on the wheelchair or the like. The footrest apparatus may be rotatable or moveable between an extended position in which the foot plates are positioned in front of the frame structure to support the user's feet when the user sits on the wheelchair or the like, and a folded position in which the footrest apparatus is positioned close to the frame structure when the footrest apparatus is not in use, for convenience of transportation and/or storage of the wheelchair and the like. Various configurations of footrest apparatuses are known, however efforts for development of footrest apparatuses continues in order to provide wheelchairs or the like having a footrest apparatus which is more convenient for use.

Accordingly there is a need for a device having an improved footrest apparatus for assisting an individual with mobility.

SUMMARY

In accordance with one aspect, there is provided a device for assisting a user with mobility, comprising: a frame structure supported on a plurality of wheels rotatably attached to the frame structure, a seat member attached to the frame structure and a pair of footrest assemblies, each of the footrest assemblies including a supporting frame configuration supporting a foot plate, each of the supporting frame configurations including a connecting shaft rotatably inserted downwardly into an upper end of a respective one of a pair of vertical tubes affixed to a front end and at respective sides of the frame structure, to allow the supporting frame configuration to rotate about said one of the vertical tubes between a first angular position in which the supporting frame configuration extends forwardly to position the foot plate in front of the frame structure and a second angular position in which the supporting frame configuration is folded backward and adjacent a side of the frame structure, each of the connecting shafts having an annular radial shoulder resting on an annular surface of the upper end of the vertical tube to support a foot load, each of the connecting shafts including two elastically compressible spring-buttons, at least one of the spring-buttons being compressed radially inwardly into the connecting shaft by a cylindrical inner surface of the vertical tube when the supporting frame configuration is in any angular position about the vertical tube, and only one of the spring-buttons radially and outwardly extending from the connecting shaft into a hole in the vertical tube when the supporting frame configuration is in either one of the first and second angular positions.

Other aspects and features of the described subject matter will be better understood with reference to the embodiments described hereinafter.

BRIEF DESCRIPTION OF THE DRAWINGS

Reference will now be made to the accompanying drawings, showing by way of illustration, the described subject matter, in which.

It will be noted that throughout the appended drawings, like features are identified by like reference numerals.

DETAILED DESCRIPTION

Figure 1:
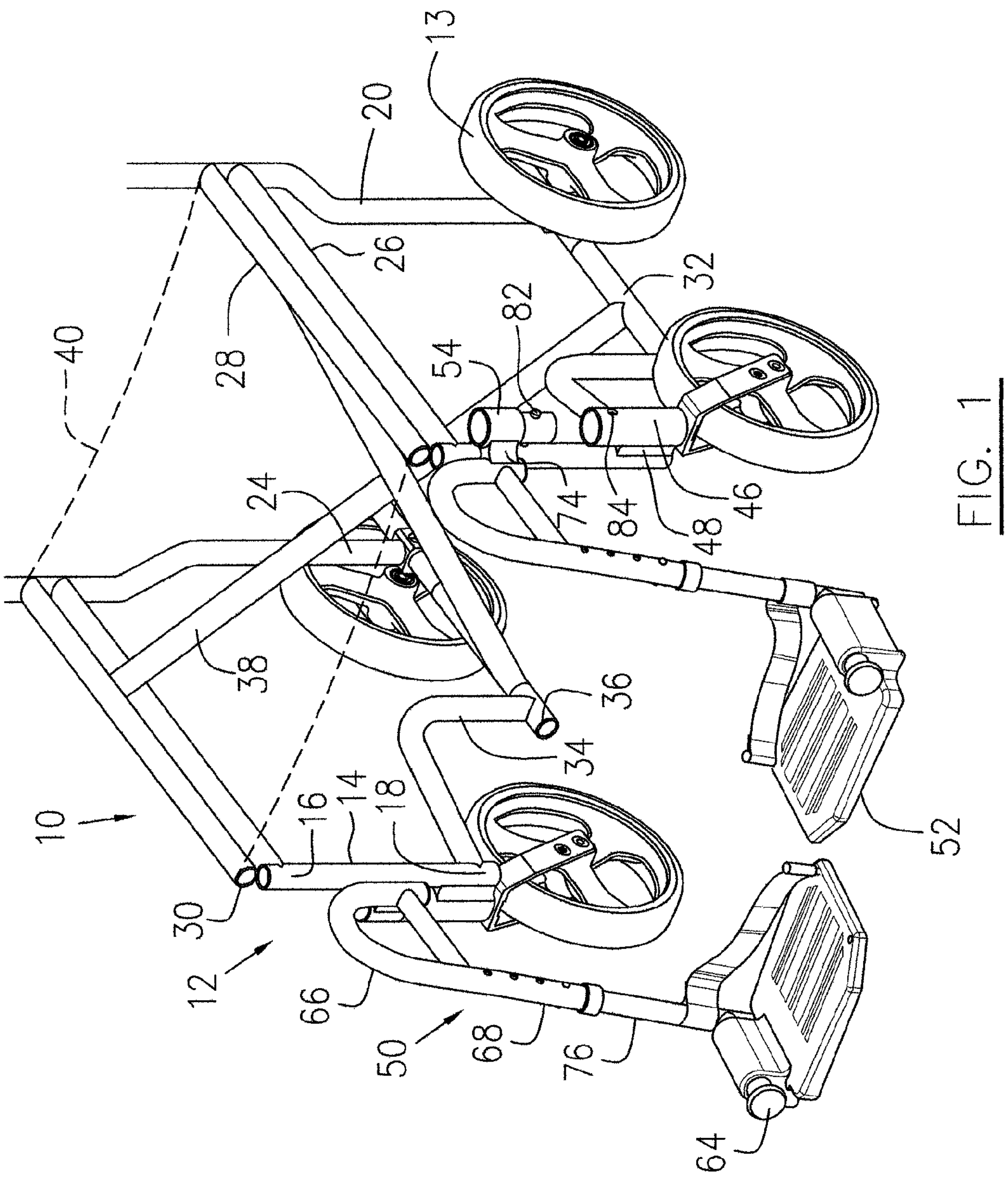
FIG. 1 is an isometic view of a device for assisting a user with mobility according to one embodiment, having a footrest apparatus in an extended position, one footrest being disconnected from a frame structure of the device, showing the connection therebetween.
Figure 2:
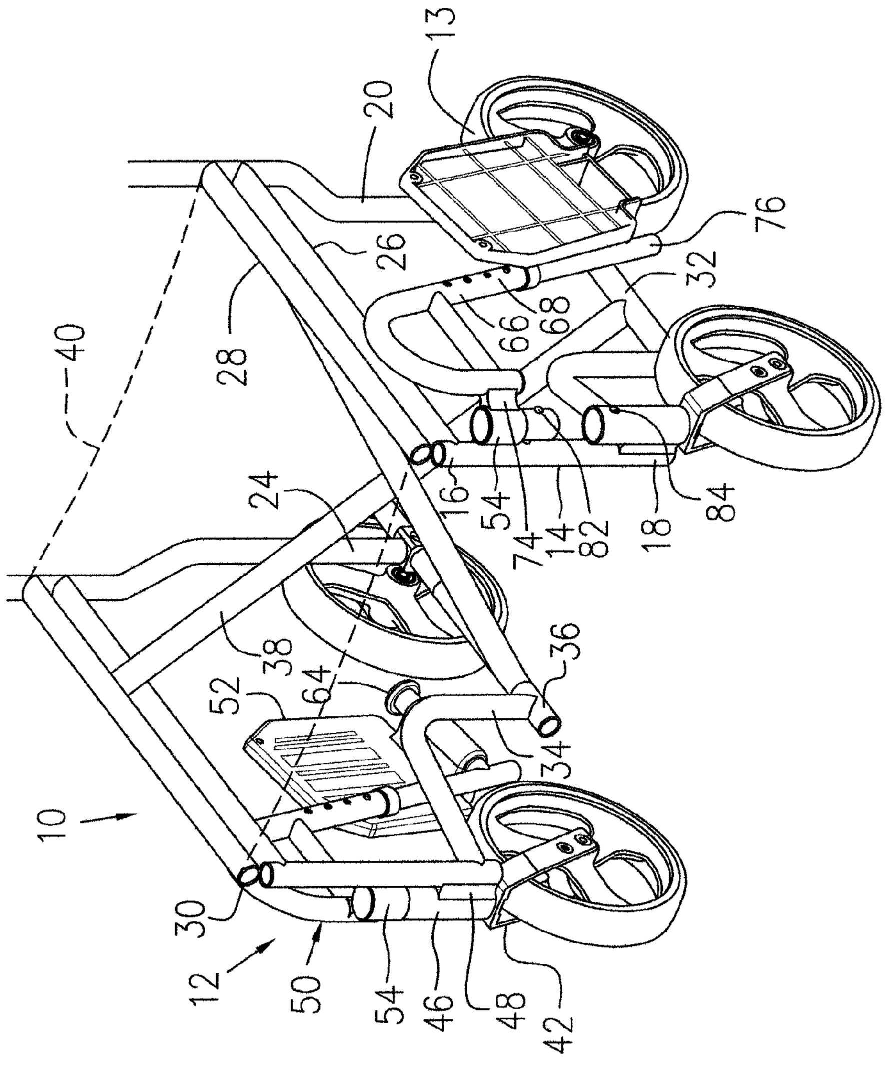
FIG. 2 is an isometric view of the device of FIG. 1 with the footrest apparatus in a folded position, one footrest being disconnected from the frame structure of the device to show the connection therebetween.
Figure 3:
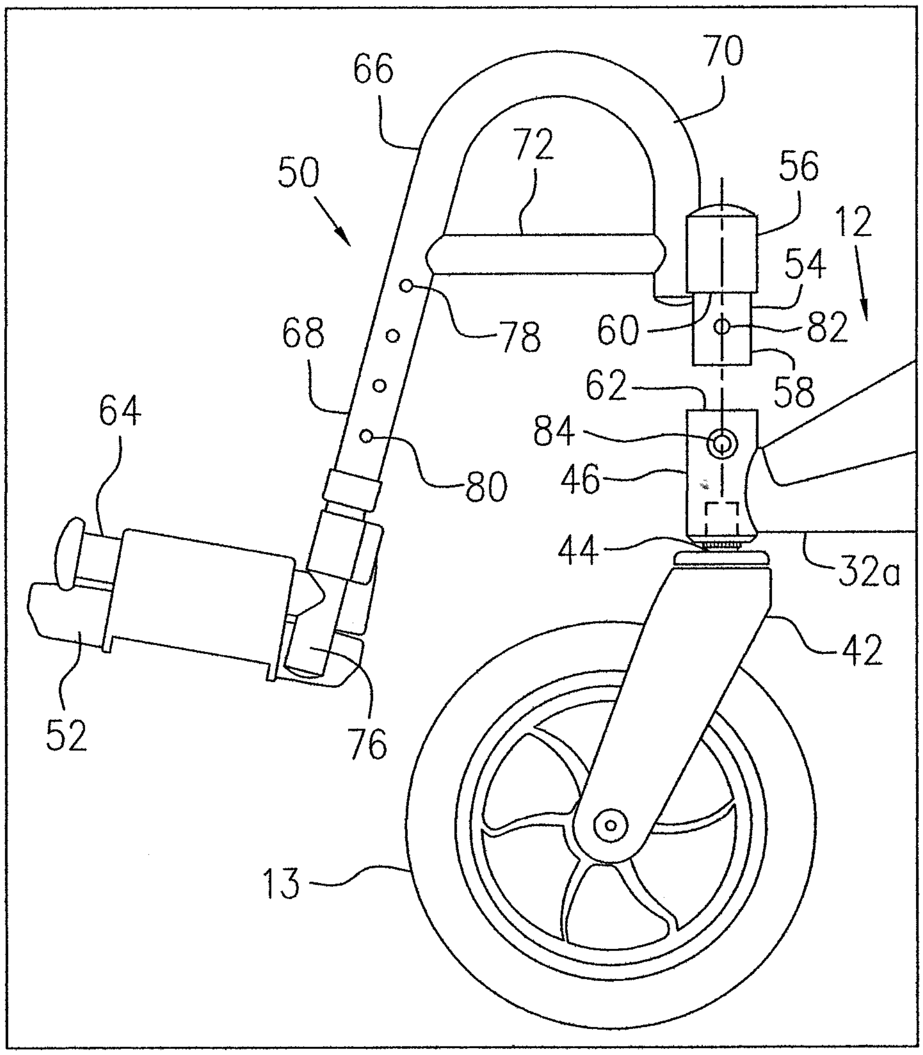
FIG. 3 is a partial side elevational view of a device for assisting a user with mobility according to another embodiment in which a footrest similar to the footrest of FIGS. 1 and 2, is connected to a frame structure different from the embodiment of FIG. 1.

Referring to FIGS. 1-3, a device 10 for assisting a user with mobility, such as a rolling walker described in the Applicant's U.S. Pat. Nos. 7,523,950 and 7,628,411, which are incorporated herein by reference, generally includes a frame structure 12 preferably made of metal tubes supported on a plurality of wheels 13 rotatably attached to the frame structure 12. According to this embodiment, four wheels 14 are used to support the device for moving along a ground surface.

The frame structure 12 has two sides symmetrical about a central vertical plane (not shown). For clarity and convenience of illustration, components which are identical on the respective sides of the device or the frame structure 12 will be identified only on one of the sides.

According to one embodiment, the frame structure 12 may include two front legs 14 disposed substantially vertically on the respective sides thereof, each front leg 14 having an upper end 16 and a lower end 18 thereof. The frame structure 12 may further include two rear legs 20 disposed substantially vertically on the respective sides thereof, each rear leg 20 having a lower end 24 and an upper end (not shown) which may be formed with a handle for grasping by a caregiver. The rear legs 20 are longer than the front legs 14. A pair of middle side tubes 26 may be provided, one on each side of the frame structure 12 such that a front end of the middle side tube 26 is affixed for example by welding to the respective front leg 14 adjacent to the upper end 16, and a rear end of the middle side tube 26 is affixed for example by welding to a middle portion (not numbered) of the respective rear leg 20. Each middle side tube 26 may extend substantially horizontally when the device 10 is supported on a level surface. A pair of upper side tubes 28 may be positioned, one on each side of the frame structure 12, above the respective middle side tube 26, substantially parallel to and slightly spaced apart from the middle side tube 26. Each upper side tube 28 may have a rear end affixed for example by welding to the middle portion of the respective rear leg 20. An elbow connector (not shown) which is used to interconnect end-to-end, two tubes oriented to each other at a right angle, may be provided to connect a front end 30 of each upper side tube 28 to the upper end 16 of the respective front leg 14.

A pair of low side tubes 32 may be provided, one on each side of the frame structure 12, positioned substantially parallel to the respective middle and upper side tubes 26, 28. Each low side tube 32 may be affixed at a rear end portion (not numbered) thereof to the low end 24 of the respective rear leg 20. A pair of L-shaped front connecting tubes 34 may be provided, one on each side of the frame structure 12, each having a vertical section (not numbered) extending downwardly to be affixed for example by welding to a front end section 36 of the respective low side tube 32, and having a substantially horizontal section (not numbered) extending forwardly to be affixed for example by welding to the lower end 18 of the respective front leg 14. Therefore, the L-shaped front connecting tube 34 on each side of the frame structure 12 provides a space for the respective wheel 13 supported on the respective front leg 14, to change directions without interference with the frame structure 12.

A pair of interconnecting tubes 38 may be provided to interconnect the two sides of the frame structure 12 together. Each interconnecting tube 38 may be affixed at an upper end (not numbered) thereof, for example by welding to a middle section of one upper side tube 28 and affixed at a low end (not numbered) thereof, for example by welding to the low side tube 32 at the opposed side of the frame structure 12. The low end of the interconnecting tubes 38 may be connected to the respective low side tube 32 at a location close to the front end portion 36 thereof.

A seat member such as a piece of fabric or leather, indicated by broken lines 40 may be provided, attached to the respective upper side tubes 28 such that a user of the device 10 may sit on the seat member 40. A piece of fabric or leather (not shown) may be attached to the respective rear legs 20 and positioned above the seat member 40 to form a backrest of the device 10.

According to one embodiment, two of the wheels 13 may be positioned one on each side of the frame structure 12, and rotatably mounted, for example to the respective low side tube 32 at a location where the low end 24 of the rear leg 20 joins the low side tube 32. Two of the wheels 13 positioned one on each side and at a front location of the device 10, may be mounted to a respective support fork member 42 which has a fork shaft 44 (see FIG. 3) received in a vertical tube, for example a fort tube 46. The fork tube 46 may be positioned substantially vertical and affixed, for example through a bracket 48 by welding, to the respective front leg 14 as shown in FIGS. 1 and 2.

According to another embodiment as shown in FIG. 3, the frame structure 12 may be configured differently from the frame structure 12 as shown in FIGS. 1 and 2 such that the fork tube 46 is affixed, for example by welding to a front end (not numbered) of the low side tube 32*a* at each side of the frame structure 12.

The fork shaft 44 may be inserted through a lower end of the fork tube 46 and held in position within the fork tube 46 to allow the support fork member 42 with the wheel 13 supported thereon, to rotate about the fork shaft 44 with respect to the fork tube 46. The support fork member 42 may extend from the fork shaft 44, downwardly in an angular orientation with respect to the vertical direction, such that the wheel 13 supported on the support fork member 42 may pivot together with the support fork member 42 about the fork tube 46 to change a rolling direction of the wheels. This type of wheel assembly is well known and will not be further described herein.

The device 10 may further include a pair of foot rest assemblies positioned one on each side of the front of the device 10. Each foot rest assembly may have a supporting frame configuration 50 which supports a foot plate 52. Each of the supporting frame configurations 50 may include a connecting shaft 54 rotatably inserted downwardly into an upper end of the respective fork tube 46 to allow the supporting frame configuration 50 to rotate about the fork tube 46 between a first angular position as shown in FIG. 1 and a second angular position as shown in FIG. 2. In the first angular position the supporting frame configuration 50 may extend forwardly to place the foot plate 52 at the front of the frame structure 12. In the second angular position the supporting frame configuration 50 may be folded backward to be positioned adjacent to the respective side of the frame structure 12. The supporting frame configuration 50 of the footrest assembly at the left side of the frame structure 12 in FIGS. 1 and 2, for convenience of description and illustration only, is positioned such that the connecting shaft 54 thereof is withdrawn upwardly from the fork tube 46, in order to illustrate the details of the connection therebetween, which are further described hereinafter.

Each of the connecting shafts 54 may be formed with an upper section 56 (see FIG. 3) having an outer diameter greater than an outer diameter of a lower section 58 of the connecting tube 54, thereby defining an annular radial shoulder 60 resting on an annular surface 62 defined on an upper end of the fork tube 46. Therefore, when the footrest assembly is positioned as illustrated in FIG. 1 and a user sits on the seat member 40 with his/her feet resting on the foot plates 52, the user's foot load is substantially transferred through the contact between the annular radial shoulders 60 of the connecting shaft 54 and the annular surface 62 of the upper end of the fork tube 46, and thus to the frame structure 12 of the device 10.

According to one embodiment each of the supporting frame configurations 50 may have a substantially inverted U-shaped tube 66 having two end sections 68, 70, with one end section 68 (see FIG. 3) longer than the other section 70. A connecting bar 72 which may also be made of a metal tube, may extend between and be affixed for example by welding, to the longer end section 68 and the shorter end section 70 of the inverted U-shaped tube 66. The short end section 70 may be affixed for example by welding through a short arm 74 (see FIGS. 1 and 2) to the upper section of the connecting tube 54. An inner tube 76 may be slidably received in the longer end section 68 (which forms an outer tube) of the inverted U-shaped tube 66 to form a telescoping configuration such that the length of the inner tube 76 extending from the outer tube (the inverted U-shaped tube 66) may be selected and locked by a locking device which, for example in this embodiment, may include a pair of diametrically opposed spring-buttons 78 (see FIG. 3) projecting radially outwardly from the inner tube 76 and selectively engaged in one pair of a plurality of pairs of diametrically opposed holes 80 defined in the longer end section 68 of the inverted U-shaped tube 66. Each of the supporting frame configurations 50 further may further include a plate shaft 64 connected to a lower end of the inner tube 76, extending forwardly when the supporting frame configuration 50 is in the first angular position as shown in FIG. 1. A foot plate lock device (not numbered) may be provided, for example detachably interconnecting each foot plate 52 with one of the inner tubes 56 when the foot plate 52 is in the extended position, as illustrated in FIG. 1.

The foot plates 52 may be pivotally connected to and thus pivotable about the respective plate shafts 64 between an extended position as illustrated in FIG. 1 in which the respective foot plates 52 extend from the respective plate shafts 64 toward each other substantially transverse with respect to the frame structure 12 (when the respective supporting frame configurations 50 are in the first angular position), and a folded position as illustrated in FIG. 2 in which the foot plates 52 extend substantially upwardly from the respective plate shafts 64 (when the respective supporting frame configuration 50 is in any angular position such as in the second angular position).

In accordance with one embodiment, each of the footrest assemblies may be provided with a locking device (not numbered) for selectively locking the support frame configurations 50 in either one of the first and second angular positions. The locking device may include two elastically compressible spring-buttons 82 attached to the lower section 58 of the connecting shaft 54. The two spring-buttons 82 may be angularly spaced apart on the lower section 58 of the connecting shaft 54, for example diametrically opposed to each other, and radially outwardly extend from the lower section 58 of the connecting shaft 54. Each of the spring-buttons 82 may be pressed radially inwardly into the cylindrical wall of the lower section 58 of the connecting shaft 54 and will return to the radially outwardly projecting position when the pressing force is removed. The locking device may further include only one positioning hole 84 defined in the fork tube 46, penetrating the cylindrical wall of the fork tube 46 only once, such that only one of the two spring-buttons 82 on the lower section 58 of the connecting shaft 54 may be selectively engaged in the positioning hole 84. Therefore, at least one of the spring-buttons 82 will be compressed radially inwardly into the connecting shaft 54 by a cylindrical inner surface of the fork tube 46 when the supporting frame configuration 50 is in any angular position about the fork tube 46 (including the first and second angular positions), and only one of the spring-buttons 82 will radially and outwardly extend from the connecting shaft 54 into the positioning hole 84 in the fork tube 46 when the supporting frame configuration 50 is in either the first or second angular position.

It should be noted that the structural arrangement and functions of the button-hole locking device formed with the spring-buttons 82 and the only one positioning hole 84 are different from those of the button-hole locking device formed by a pair of spring-buttons 78 selectively engageable with the pairs of diametrically opposed holes 80 in the longer section 68 of the inverted U-shaped tube 66. The latter not only locks the height adjustment positions of the foot plates 52, but also substantially bears and transfers the foot load and as such, requires a symmetrical arrangement of the button-hole engagement about the inner tube 76 and the lower section 68 of the U-shaped tube 66 to transfer and bear the foot load in a balanced manner such that two spring buttons 78 are simultaneously engageable with a pair of selected diametrically opposed holes 80.

The locking device formed with two spring buttons 82 on the connecting shaft 54 and the only one positioning hole 84 in the fork tube 46 does not bear or transfer foot load which is supported by and transferred through the radial shoulder 60 on the connecting tube 54 and the annular surface 62 of the top end of the fork tube 46. Therefore, this button-hole engagement does not require a symmetrical arrangement about the connecting shaft 54 and the fork tube 46. The only one positioning hole 84 advantageously provides convenience for unlocking the supporting frame configuration 50 from either one of the first and second angular positions because pressing the spring-button 82 radially inwardly can be conducted through the only one positioning hole 84. The only one positioning hole 84 is defined in the fork tube 46 which is affixed to the frame structure 12 and does not change its angular position regardless of the angular position of the supporting frame configuration 50. This makes it possible to unlock the spring-button 82 from the positioning hole 84 in the same location, regardless of the first or second angular position in which the supporting frame configuration 50 is locked. This is advantageous because the fork tube 46 in which the positioning hole 84 is defined, is welded side-by-side to the respective front leg 14 and is in an area crowded with footrest components. The positioning hole 84 may be advantageously defined in a location at an outermost side of the respective fork tube 46. The angular position of the two spring-buttons 82 attached to the lower section 58 of the connecting tube 54, depends on the angular relationship between the first and second angular positions of the supporting frame configuration 50 (the footrest assembly). If the supporting frame configuration 50 requires 180 degree rotation between the first and second angular positions, the two spring-buttons 82 attached to each connecting shaft 54 may be diametrical opposed about the connecting shaft 54. Otherwise, the two spring-buttons 82 attached to the respective connecting shaft 54 may be angularly spaced in accordance with the required rotation degree of the support frame configuration 50 (the footrest assembly) between the first and second angular positions.

Modifications and improvements to the above-described embodiments of the present invention may become apparent to those skilled in the art. For example, the frame structure of the device may vary from the above-described configuration. The foregoing description is intended to be exemplary rather than limiting. The scope of the present invention is therefore intended to be limited by the scope of the appended claims.

We claim:

1. A device for assisting a user with mobility, comprising: a frame structure supported on a plurality of wheels rotatably attached to the frame structure, a seat member attached to the frame structure and a pair of footrest assemblies, each of the footrest assemblies including a supporting frame configuration supporting a foot plate, each of the supporting frame configurations including a connecting shaft rotatably inserted downwardly into an upper end of a respective one of a pair of vertical tubes affixed to a front end and at respective sides of the frame structure, to allow the supporting frame configuration to rotate about said one of the vertical tubes between a first angular position in which the supporting frame configuration extends forwardly to position the foot plate in front of the frame structure and a second angular position in which the supporting frame configuration is folded backward and adjacent a side of the frame structure, each of the connecting shafts having an annular radial shoulder resting on an annular surface of the upper end of the vertical tube to support a foot load, each of the connecting shafts including two elastically compressible spring-buttons, at least one of the spring-buttons being compressed radially inwardly into the connecting shaft by a cylindrical inner surface of the vertical tube when the supporting frame configuration is in any angular position about the vertical tube, and only one of the spring-buttons radially and outwardly extending from the connecting shaft into a hole in the vertical tube when the supporting frame configuration is in either one of the first and second angular positions.

2. The device as defined in claim 1 wherein the wheels comprise a pair of front wheel assemblies, each of the front wheel assemblies including a fork shaft rotatably received in a low end of one of the vertical tubes.

3. The device as defined in claim 2 wherein the two spring-buttons are diametrically opposed about the connecting shaft of each supporting frame configuration.

4. The device as defined in claim 2 wherein the hole defined in the respective vertical tubes is located at an outermost side of the respective vertical tubes with respect to the frame structure.

5. The device as defined in claim 2 wherein each of the supporting frame configurations comprises a plate shaft, the foot plate being pivotally connected to and pivotable about the respective plate shafts between an extended position in which the respective foot plates extend toward each other substantially transverse with respect to the frame structure when the respective supporting frame configuration is in the first angular position, and a folded position in which the foot plate extend substantially upwardly from the plate shafts, respectively.

6. The device as defined in claim 2 wherein each of the supporting frame configurations comprises telescopically connected inner and outer tubes, the inner tube being connected to one of the plate shafts and the outer tube being connected to one of the connecting shafts.

7. The device as defined in claim 6 wherein each of the inner tubes comprises a pair of diametrically opposed spring-buttons selectively engageable in a plurality of pairs of holes defined in each of the outer tubes to lock a connected one of the foot plates in a selected height position.

* * * * *